United States Patent
Krishan et al.

(10) Patent No.: US 11,638,134 B2
(45) Date of Patent: Apr. 25, 2023

(54) METHODS, SYSTEMS, AND COMPUTER READABLE MEDIA FOR RESOURCE CLEANUP IN COMMUNICATIONS NETWORKS

(71) Applicant: Oracle International Corporation, Redwood Shores, CA (US)

(72) Inventors: Rajiv Krishan, Bangalore (IN); Geeta Mohanty, Bangalore (IN); Tarek Assali, Wellesley, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/367,196

(22) Filed: Jul. 2, 2021

(65) Prior Publication Data

US 2023/0007456 A1    Jan. 5, 2023

(51) Int. Cl.
| | |
|---|---|
| *H04W 4/50* | (2018.01) |
| *H04W 4/24* | (2018.01) |
| *H04W 8/18* | (2009.01) |
| *H04W 12/48* | (2021.01) |
| *H04W 72/12* | (2009.01) |
| *H04W 76/18* | (2018.01) |
| *H04W 72/1273* | (2023.01) |

(52) U.S. Cl.
CPC ............... *H04W 4/50* (2018.02); *H04W 4/24* (2013.01); *H04W 8/18* (2013.01); *H04W 12/48* (2021.01); *H04W 72/1273* (2013.01); *H04W 76/18* (2018.02)

(58) Field of Classification Search
CPC ....... H04W 4/50; H04W 76/18; H04W 12/48; H04W 4/24; H04W 8/18; H04W 72/1273
See application file for complete search history.

(56) References Cited

U.S. PATENT DOCUMENTS

| | | | |
|---|---|---|---|
| 6,707,809 B1 * | 3/2004 | Warrier ................... | H04W 8/06 370/328 |
| 6,990,086 B1 * | 1/2006 | Holur ..................... | H04L 47/31 370/356 |

(Continued)

OTHER PUBLICATIONS

"3rd Generation Partnership Project; Technical Specification Group Core Network and Terminals; 5G System; Policy and Charging Control signalling flows and QoS parameter mapping; Stage 3 (Release 16)," 3GPP TS 29.513, V16.7.0, pp. 1-151 (Mar. 2021).

(Continued)

*Primary Examiner* — Jenee Holland
(74) *Attorney, Agent, or Firm* — Jenkins, Wilson, Taylor & Hunt, P.A.

(57) ABSTRACT

Methods, systems, and computer readable media for resource cleanup in communications networks are disclosed. One method for resource cleanup in a communications network comprises: at a policy control function (PCF) comprising at least one processor: receiving, from a binding support function (BSF), a first notification indicating a potentially stale or inactive first binding record, wherein the first notification includes context data associated with the first binding record; determining that resource cleanup associated with the first binding record should be performed; and initiating, using the context data, resource cleanup associated with the first binding record at one or more network entities.

18 Claims, 8 Drawing Sheets

(56) References Cited

U.S. PATENT DOCUMENTS

| | | | | |
|---|---|---|---|---|
| 8,509,815 | B1* | 8/2013 | Shojayi | H04W 4/02 |
| | | | | 455/456.3 |
| 8,612,612 | B1* | 12/2013 | Dukes | H04L 67/141 |
| | | | | 709/203 |
| 8,793,396 | B2 | 7/2014 | Zhou et al. | |
| 9,215,133 | B2 | 12/2015 | Baniel et al. | |
| 10,277,637 | B2 | 4/2019 | Butala | |
| 11,283,883 | B1* | 3/2022 | Krishan | H04M 15/8228 |
| 2002/0036983 | A1* | 3/2002 | Widegren | H04M 15/00 |
| | | | | 370/230.1 |
| 2002/0068588 | A1* | 6/2002 | Yoshida | H04L 1/0002 |
| | | | | 455/461 |
| 2002/0145990 | A1* | 10/2002 | Sayeedi | H04W 76/12 |
| | | | | 370/335 |
| 2003/0033394 | A1* | 2/2003 | Stine | H04L 47/823 |
| | | | | 709/222 |
| 2003/0129980 | A1* | 7/2003 | Sayeedi | H04W 64/00 |
| | | | | 455/435.1 |
| 2003/0219024 | A1* | 11/2003 | Purnadi | H04L 9/40 |
| | | | | 370/401 |
| 2004/0008661 | A1* | 1/2004 | Myles | H04J 3/0664 |
| | | | | 370/350 |
| 2004/0062227 | A1* | 4/2004 | Sayeedi | H04W 28/18 |
| | | | | 370/350 |
| 2005/0022115 | A1 | 1/2005 | Baumgartner et al. | |
| 2005/0036463 | A1* | 2/2005 | Nesargi | H04W 76/20 |
| | | | | 370/335 |
| 2005/0053070 | A1* | 3/2005 | Jouppi | H04L 47/765 |
| | | | | 370/395.3 |
| 2005/0154780 | A1* | 7/2005 | Sarja | H04L 12/66 |
| | | | | 709/203 |
| 2006/0104214 | A1* | 5/2006 | Borella | H04W 88/16 |
| | | | | 370/252 |
| 2006/0203773 | A1* | 9/2006 | Georges | H04L 47/824 |
| | | | | 370/310.1 |
| 2007/0058585 | A1* | 3/2007 | Mudigonda | H04W 36/10 |
| | | | | 370/912 |
| 2007/0107047 | A1* | 5/2007 | Mukherjee | H04L 63/0892 |
| | | | | 726/4 |
| 2007/0143483 | A1* | 6/2007 | Lim | H04L 67/14 |
| | | | | 709/227 |
| 2007/0249342 | A1* | 10/2007 | Huang | H04L 67/02 |
| | | | | 455/435.1 |
| 2007/0291678 | A1* | 12/2007 | Chowdhury | H04W 4/24 |
| | | | | 370/328 |
| 2008/0126802 | A1* | 5/2008 | Li | H04L 9/3234 |
| | | | | 713/168 |
| 2008/0215888 | A1* | 9/2008 | Barriga | H04L 63/0807 |
| | | | | 713/176 |
| 2008/0305762 | A1* | 12/2008 | Malosh | H04B 7/18506 |
| | | | | 455/431 |
| 2009/0082049 | A1* | 3/2009 | Song | H04W 4/08 |
| | | | | 455/518 |
| 2009/0207808 | A1* | 8/2009 | McCann | H04W 36/0016 |
| | | | | 455/552.1 |
| 2009/0232310 | A1* | 9/2009 | Holtmanns | H04L 9/0891 |
| | | | | 713/2 |
| 2010/0106845 | A1* | 4/2010 | Hu | H04W 76/12 |
| | | | | 709/228 |
| 2010/0286490 | A1 | 11/2010 | Koverzin | |
| 2011/0138005 | A1 | 6/2011 | Zhou et al. | |
| 2011/0165901 | A1 | 7/2011 | Baniel et al. | |
| 2011/0320544 | A1 | 12/2011 | Yee et al. | |
| 2012/0072585 | A1* | 3/2012 | Yang | H04L 69/40 |
| | | | | 709/227 |
| 2012/0099715 | A1 | 4/2012 | Ravishankar et al. | |
| 2012/0176894 | A1* | 7/2012 | Cai | H04L 47/20 |
| | | | | 370/230 |
| 2012/0202550 | A1* | 8/2012 | Marsico | H04W 12/06 |
| | | | | 455/515 |
| 2012/0221899 | A1 | 8/2012 | Cervenak et al. | |
| 2012/0225679 | A1* | 9/2012 | McCann | H04L 65/1016 |
| | | | | 455/466 |
| 2013/0262308 | A1 | 10/2013 | Cai et al. | |
| 2014/0010206 | A1* | 1/2014 | Bi | H04W 76/22 |
| | | | | 370/331 |
| 2014/0064124 | A1* | 3/2014 | Paladugu | H04W 76/19 |
| | | | | 370/252 |
| 2014/0086052 | A1 | 3/2014 | Cai et al. | |
| 2014/0219100 | A1* | 8/2014 | Pandey | H04W 28/0842 |
| | | | | 370/328 |
| 2014/0233368 | A1 | 8/2014 | Baniel et al. | |
| 2014/0335815 | A1 | 11/2014 | Ephraim et al. | |
| 2015/0236915 | A1 | 8/2015 | Mohammed et al. | |
| 2016/0005007 | A1* | 1/2016 | Marsico | G06Q 10/20 |
| | | | | 705/305 |
| 2017/0237781 | A1* | 8/2017 | Butala | H04L 12/1407 |
| | | | | 709/227 |
| 2018/0192471 | A1* | 7/2018 | Li | H04W 4/60 |
| 2019/0158408 | A1* | 5/2019 | Li | H04L 67/104 |
| 2019/0357301 | A1* | 11/2019 | Li | H04W 80/10 |
| 2020/0112907 | A1* | 4/2020 | Dao | H04M 15/84 |
| 2020/0145876 | A1* | 5/2020 | Dao | H04M 15/66 |
| 2020/0146077 | A1* | 5/2020 | Li | H04W 76/10 |
| 2020/0177681 | A1* | 6/2020 | Wang | H04L 47/801 |
| 2020/0221541 | A1* | 7/2020 | Yan | H04W 48/16 |
| 2020/0228420 | A1* | 7/2020 | Dao | H04L 41/40 |
| 2020/0229199 | A1* | 7/2020 | Xin | H04W 28/0268 |
| 2020/0358909 | A1* | 11/2020 | Ahmadi | H04L 65/1016 |
| 2020/0396649 | A1* | 12/2020 | Zong | H04W 36/12 |
| 2021/0014141 | A1* | 1/2021 | Patil | H04W 24/02 |
| 2021/0037375 | A1* | 2/2021 | Cakulev | H04W 8/186 |
| 2021/0120408 | A1* | 4/2021 | Pazhyannur | H04W 8/183 |
| 2021/0144517 | A1* | 5/2021 | Guim Bernat | G06F 9/5072 |
| 2021/0152470 | A1* | 5/2021 | Filsfils | H04L 69/22 |
| 2021/0168610 | A1* | 6/2021 | Adrangi | H04W 60/00 |
| 2021/0195506 | A1* | 6/2021 | Bartolomé Rodrigo | |
| | | | | H04W 4/50 |
| 2021/0211904 | A1* | 7/2021 | Zong | H04W 48/18 |
| 2021/0212136 | A1* | 7/2021 | Lee | H04W 48/16 |
| 2021/0321251 | A1* | 10/2021 | Colom Ikuno | H04M 15/66 |
| 2021/0321466 | A1* | 10/2021 | Colom Ikuno | H04W 76/10 |
| 2021/0360084 | A1* | 11/2021 | Song | G06F 16/955 |
| 2021/0385302 | A1* | 12/2021 | Cakulev | H04L 67/02 |
| 2021/0409942 | A1* | 12/2021 | De Kievit | H04W 12/72 |
| 2022/0022101 | A1* | 1/2022 | Wang | H04L 12/1407 |
| 2022/0070702 | A1* | 3/2022 | Puente Pestaña | H04W 8/186 |
| 2022/0201085 | A1* | 6/2022 | Hu | H04L 12/1407 |

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Usage of the Unified Data Repository service for Policy Data, Application Data and Structured Data for Exposure; Stage 3 (Release 16)," 3GPP TS 29.519, V16.7.0, pp. 1-168 (Mar. 2021).

"3rd Generation Partnership Project; Technical Specification Group Core Network and Terminals; 5G System; Binding Support Management Service; Stage 3 (Release 16)," 3GPP TS 29.521, V16.7.0, pp. 1-37 (Mar. 2021).

"3rd Generation Partnership Project; Technical Specification Group Core Network and Terminals; 5G System; Spending Limit Control Service; Stage 3 (Release 16)," 3GPP TS 29.594, V16.5.0, pp. 1-43 (Mar. 2021).

Commonly-assigned, Co-pending U.S. Appl. No. 17/579,077 for "Methods, Systems, and Computer Readable Media for Health Checking Involving Common Application Programming Interface Framework," (Unpublished, filed Jan. 19, 2022).

"3rd Generation Partnership Project; Technical Specification Group Services and System Aspects; Functional architecture and information flows to support Common API Framework for 3GPP Northbound APIs; Stage 2 (Release 16)," 3GPP 23.222, V16.10.0, pp. 1-118 (Jun. 2021).

(56) References Cited

OTHER PUBLICATIONS

"3rd Generation Partnership Project; Technical Specification Group Core Network and Terminals; Common API Framework for 3GPP Northbound APIs; (Release 16)," 3GPP TS 29.222, V16.7.0, pp. 1-149 (Jun. 2021).
"Common API Framework (CAPIF)," 3GPP, https://www.3gpp.org/common-api-framework-capif, pp. 1-4 (Sep. 30, 2019).
Notice of Allowance and Fee(s) Due for U.S. Appl. No. 15/043,446 (dated Dec. 18, 2018).
Advisory Action Before the Filing of an Appeal Brief, Examiner-Initiated Interview Summary, and AFCP 2.0 Decision for U.S. Appl. No. 15/043,446 (dated Oct. 25, 2018).
Final Office Action and Applicant-Initiated Interview Summary for U.S. Appl. No. 15/043,446 (dated Jul. 25, 2018).
Non-Final Office Action for U.S. Appl. No. 15/043,446 (dated Dec. 20, 2017).
Notice of Allowance and Fee(s) Due for U.S. Appl. No. 13/772,286 (dated Aug. 10, 2015).
Non-Final Office Action for U.S. Appl. No. 13/772,286 (dated Dec. 18, 2014).
"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).
Znaty, "Diameter, GPRS, (LTE+ePC=EPS), IMS, PCC and SDM," EFORT (May 2010). (Part 1 of 2, pp. 1-229).
Znaty, "Diameter, GPRS, (LTE+ePC=EPS), IMS, PCC and SDM," EFORT (May 2010). (Part 2 of 2, pp. 230-460).

\* cited by examiner

```
"vendorSpecific-000111": {
  "version": 1,
  "notificationUrl": <PCF notification Url>,
  "bindingCreateUpdateTime" : <Timestamp>,
  "cookie": {
    "smf": {
      "notificationUrl": <SMF notification Url>
    },
    "udr": {
      "resourceUrl ": <absolute UDR resource Id>
    },
    "chf": {
      "resourceUrl": <absolute CHF resource Id>
    },
    ... (extended)
  }
}
```

METHODS, SYSTEMS, AND COMPUTER READABLE MEDIA FOR RESOURCE CLEANUP IN COMMUNICATIONS NETWORKS

TECHNICAL FIELD

The subject matter described herein relates to improving resource management in fifth generation (5G) and subsequent generation communications networks. More particularly, the subject matter described herein relates to methods, systems, and computer readable media for resource cleanup in 5G and subsequent generation communications networks.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destined producer NF.

One problem with the existing 3GPP service architecture is protocol data unit (PDU) session binding information maintained in a PDU session binding database at a binding support function (BSF) may become stale or inactive. For example, after user equipment (UE) registers with the network, the UE triggers (via a session management function (SMF)) the creation of a PDU session in order to exchange data with the network. As part of the PDU session creation process, a policy control function (PCF) is assigned to the session to generate policy rules for the session to control quality of service and charging for the session. The PCF assigned to the session registers with a BSF, and the BSF creates a binding record for the session in its database. NF service consumers seeking to discover the PDU session binding for a UE may do so by querying the BSF using a discovery application programming interface (API) provided by the BSF. After a binding record becomes inactive or stale, the PCF may send a delete binding record request or other message for deleting the stale binding record. However, if stale binding records at the BSF are not deleted or cleaned up, resources can be wasted and/or other inefficiencies can occur. For example, if stale PDU session binding information contains inaccurate information, a consumer NF may receive PDU session binding information for a PCF that is out of service or no longer operational. The consumer NF may then seek to contact the non-operational PCF, fail to receive a response, and then initiate discovery with an NRF to obtain alternate PCF session binding information for the UE. Requiring consumer NFs to contact the BSF, contact the non-operational PCF, contact the NRF, and then contact the alternate PCF assigned to a PDU session can result in delays in providing of services to UEs.

In light of these and other challenges, there exists a need for improved resource cleanup in communications networks.

SUMMARY

Methods, systems, and computer readable media for resource cleanup in communications networks are disclosed. One example method for resource cleanup in a communications network comprises: at a policy control function (PCF) comprising at least one processor: receiving, from a binding support function (BSF), a first notification indicating a potentially stale or inactive first binding record, wherein the first notification includes context data associated with the first binding record; determining that resource cleanup associated with the first binding record should be performed; and initiating, using the context data, resource cleanup associated with the first binding record at one or more network entities.

One example system for resource cleanup in a communications network includes at least one processor, a memory, and a PCF implemented using the at least one processor and the memory. The PCF is configured for receiving, from a BSF, a first notification indicating a potentially stale or inactive first binding record, wherein the first notification includes context data associated with the first binding record; determining that resource cleanup associated with the first binding record should be performed; and initiating, using the context data, resource cleanup associated with the first binding record at one or more network entities.

One example non-transitory computer readable medium comprising computer executable instructions embodied in the non-transitory computer readable medium that when executed by at least one processor of at least one computer cause the at least one computer to perform steps comprising: at a PCF comprising at least one processor: receiving, from a BSF, a first notification indicating a potentially stale or inactive first binding record, wherein the first notification includes context data associated with the first binding record; determining that resource cleanup associated with the first binding record should be performed; and initiating, using the context data, resource cleanup associated with the first binding record at one or more network entities.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 depicts example context data associated with a binding record;

DETAILED DESCRIPTION

Figure 1:
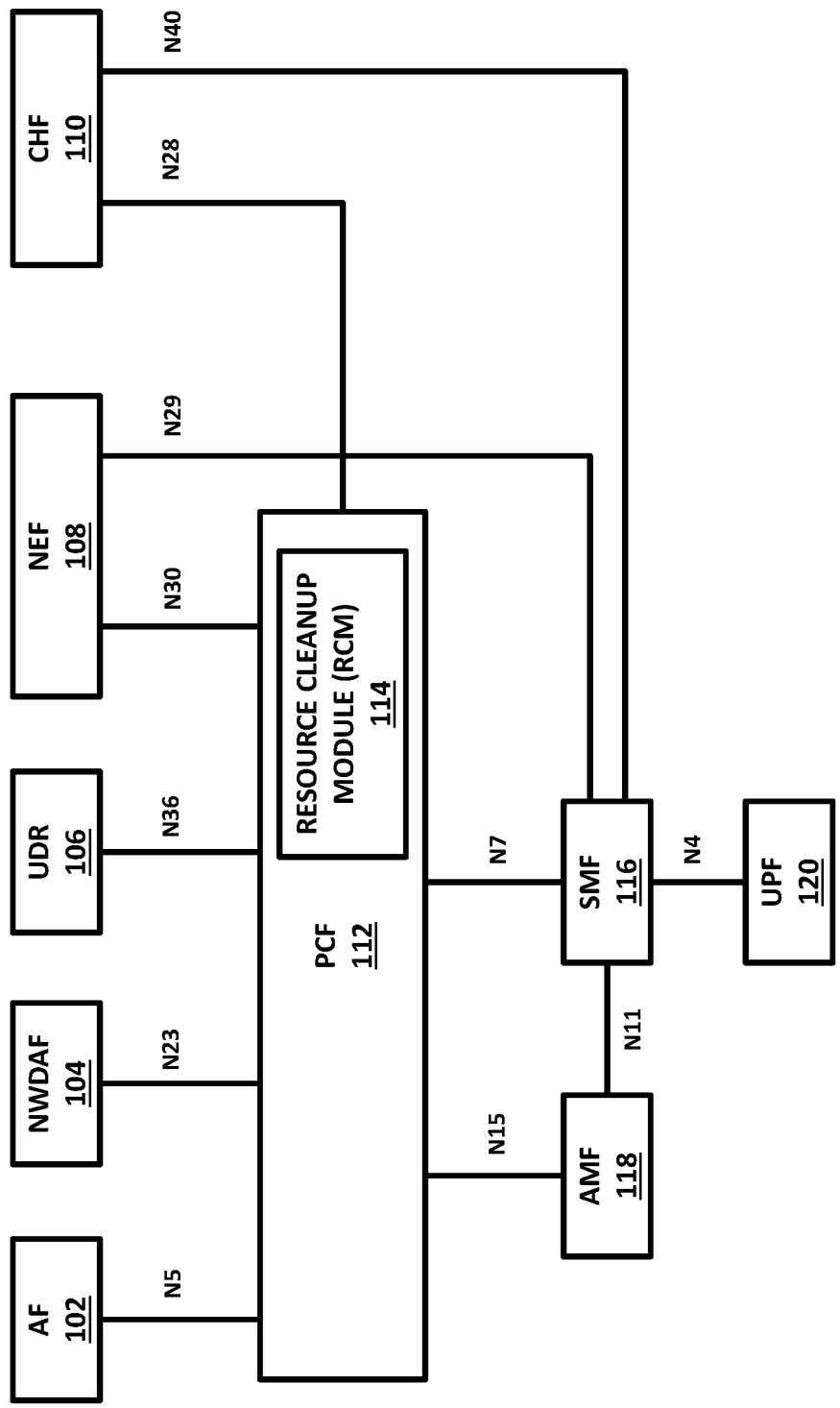
FIG. 1 is a network diagram illustrating an example fifth generation (5G) network architecture associated with a policy control function (PCF)

The subject matter described herein relates to methods, systems, and computer readable media for resource cleanup in communications networks. In 5G communications networks, the binding support management service (also referred to as the Nbsf_Management service) as defined by 3GPP, is provided by a binding support function (BSF). The Nbsf_Management service allows the BSF to provide protocol data unit (PDU) session binding functionality, which can ensure that an application function (AF) request for a certain PDU session can reach the relevant policy control function (PCF) having the PDU session information.

Generally, a PCF may delete or cleanup binding records (also referred to herein as bindings) at the BSF when the binding records become stale (e.g., inactive or unneeded). While stale binding records are generally deleted, various scenarios exist that can result in stale binding records being left at the BSF. For example, these scenarios may involve a PCF or another network function (NF) failing to send a delete binding record request to a BSF, a BSF experiencing issues or being unavailable when a PCF or other node attempts to delete an existing binding record, or a PCF experiencing context data loss (e.g., loss of resource mapping records) in response to a PCF crash or failure and therefore not trigger a cleanup at the BSF because the PCF is unaware of the binding records. Moreover, e.g., in scenarios where a BSF has stale binding records due to context data loss at a PCF, it may be possible or even likely that PCF session related information (e.g., regarding bindings or related resources) are stale at other NFs, e.g. a unified data repository (UDR), a charging function (CHF), a session management function (SMF), a network data analytics functions (NWDAF), etc.

While various NFs may be configured to detect stale sessions and/or related records and perform cleanup operations as needed, detecting stale session/records may not be easy to implement in every NF and various issues can arise. For example, a network may include or utilize NFs (e.g. SMFs, UDRs, CHFs, BSFs, PCFs, etc.) from multiple different vendors with each having various capabilities and, as such, some NFs may lack support for stale session/record detection and cleanup. Moreover, e.g., to cross-verify if a detected session/record is stale, a producer NF may need a callback API with consumer NFs so that the consumer NFs can check if a session is still valid. For example, when an SMF creates a session at a PCF, the SMF may provide its notification uniform resource locator (URL) to the PCF for update/terminate notifications. However, callback API support may not be available for all interfaces on which a PCF is creating or using resources (e.g., sessions and/or subscription). Thus, NFs that lack callback API support may lack efficient or effective stale session detection or verification techniques.

In accordance with some aspects of the subject matter described herein, methods, systems, mechanisms, and/or techniques are disclosed for resource cleanup in a communications network. For example, a PCF in accordance with various aspects described herein can initiate, using a context data associated with a stale binding record from a BSF, resource cleanup at one or more network entities. In this example, a BSF in accordance with various aspects described herein can detect a potentially stale binding record and send a notification comprising context data (e.g., a cookie containing URLs for communicating with one or more NFs) about the binding record to the PCF, e.g., via a PUT operation. After receiving the binding record and confirming that the binding record is stale, the PCF may use the context data to identify various NFs associated with the stale binding record and communicate with the NFs to trigger resource cleanup associated with the stale binding record.

In accordance with some aspects of the subject matter described herein, methods, systems, mechanisms, and/or techniques are disclosed for providing context data (e.g., as vendor specific extension attributes or JSON data objects) to a BSF during creation and/or update of a binding record. In some embodiments, context data may include mandatory and optional data and may be stored in a cookie or abstract data object. Example mandatory data may include a version number for indicating the version of the context data format, a callback address (e.g., a "notificationURL" value) for allowing a BSF to notify a relevant PCF, and/or a time or timestamp value (e.g., a 'bindingCreateUpdateTime' value) for indicating when a related binding record was created or updated (e.g., most recently). Example optional data may include information elements for one or more NFs that are associated with the binding record or a related session and may include information about other subscriptions or resources that PCF might have created at those NFs. For example, an optional SMF information element may include a URL (e.g., a "notificationURL" value) or other identifier (ID) usable for notifying or communicating with a SMF, e.g., regarding resource cleanup. In another example, an optional UDR information element may include a URL (e.g., a "resourceURL" value) or other ID usable for notifying or communicating with a UDR, e.g., regarding resource cleanup. In another example, an optional CHF information element may include a URL or other ID (e.g., a "resourceUrl" value) usable for notifying or communicating with a CHF, e.g., regarding resource cleanup.

Advantageously, by utilizing one or more techniques, systems, and/or methods described herein, a PCF, a BSF, or other entity may perform various aspects associated with verifying stale binding records, performing resource cleanup associated with stale binding records, and/or using context data associated with the stale binding records. For example, an example BSF in accordance with various aspects described herein may utilize a received URL (e.g., from a PCF) to communicate with the PCF so that the BSF can audit and/or confirm whether binding records are stale. In another example, an example BSF in accordance with various aspects described herein may utilize a received URL (e.g., from a PCF) to communicate with the PCF so that the BSF can provide context data associated with a binding record to the PCF, e.g., after a PCF failure resulting in context data loss. In another example, an example BSF in accordance with various aspects described herein may utilize a PCF notification about a potentially stale binding record and related context data to initiate resource cleanup at one or more NFs associated with the binding record. In some embodiments, by utilizing one or more aspects described herein, an example BSF and/or PCF may facilitate resource cleanup at various NFs including NFs that lack logic to independently detect of stale information (e.g., record, resource, or session information) and perform cleanup procedures, thereby improving resource cleanup and/or resource management (e.g., resource utilization) in a communications network. Moreover, by utilizing one or more aspects described herein, an example BSF and/or PCF in accordance with various aspects described herein may be fully backward compatible, may not impact NFs from various vendors, and may not require changes to existing 3GPP defined 5G core call flows.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture associated with a PCF 112. The architecture depicted in FIG. 1 includes various NFs that interact with or are associated with PCF 112 including an AF 102, an NWDAF 104, a UDR 106, a network exposure function (NEF) 108, a CHF 110, an SMF 116, an access and mobility management function (AMF) 118, and a user plane function (UPF) 120. In some embodiments, each NF may be implemented using various suitable entities, e.g., software executing on at least one processor, one or more nodes, or one or more computing devices.

AF 102 may represent an NF for performing or providing application services and may communicate with PCF 112 via an N5 or other interface.

NWDAF 104 may represent an NF for performing or providing various network analytics functions and may communicate with PCF 112 via an N23 or other interface.

UDR 106 may represent an NF for providing a unified data store for storing application, subscription, authentication, service authorization, policy data, session binding and/or application state information and may communicate with PCF 112 via an N35 or other interface.

NEF 108 may represent an NF that provides application programming interfaces (APIs) for application functions seeking to obtain information about Internet of things (IoT) devices and other devices attached to the network and may communicate with PCF 112 via an N30 or other interface and may communicate with SMF 116 via an N29 or other interface. In some embodiments, NEF 108 may perform similar functions to those performed a service capability exposure function (SCEF) in 4G networks.

CHF 110 may represent an NF for providing or performing charging services for authorized network functions and may communicate with PCF 112 via an N28 or other interface and may communicate with SMF 116 via an N40 or other interface. In some embodiments, CHF 110 may include online and offline charging functionality.

SMF 116 may represent an NF for providing or performing operations associated with managing sessions (e.g., between AMF 118 and PCF 112) and may communicate with PCF 112 via an N7 or other interface and may communicate with AMF 118 via an N11 or other interface.

AMF 118 may represent an NF for providing or performing mobility management operations and may communicate with PCF 112 via an N15 or other interface. In some embodiments, AMF 118 may perform similar functions to those performed by a mobility management entity (MME) in 4G networks.

UPF 120 may represent an NF for providing or performing user plane services and can support various proxy functionality for user plane services.

PCF 112 may represent an NF for performing policy related operations in a communications network. For example, when SMF 116 send a create session request, PCF 112 may query UDR 106 and CHF 110 for relevant subscriber data and charging data, respectively. In this example, PCF 112 may use this obtained information to generate policy rules and may provide those rules to SMF 116 or other NFs.

In some embodiments, PCF 112 may be implemented using a node or computing device with one or more processors and memory. In such embodiments, PCF 112 or a related node may include hardware, firmware, and software. For example, PCF 112 or a related node may include physical processors, data storage, communications interfaces (e.g., network interface cards), and/or other components.

In some embodiments, PCF 112 or a related node may include or interact with a resource cleanup module (RCM) 114. RCM 114 may represent a suitable entity (e.g., software executing on a processor) for performing various aspects associated with stale binding record detection and/or related resource cleanup at one or more NFs. For example, PCF 112 or RCM 114 may be configured for receiving, from a BSF, a notification indicating a potentially stale or inactive binding record, wherein the notification includes context data associated with the binding record; determining that resource cleanup associated with the binding record should be performed (e.g., because the binding record is stale); and initiating, using the context data, resource cleanup associated with the first binding record at one or more network entities.

In some embodiments, PCF 112 and/or RCM 114 may access (e.g., read from and/or write information to) accessible data storage. Such data storage may be any suitable entity (e.g., a computer readable medium or memory) for storing various data associated with detecting stale binding records, decoding or using context data associated with binding records, and/or triggering or initiating resource cleanup (e.g., deleting session information) at various network entities associated with stale binding records.

It will be appreciated that FIG. 1 is for illustrative purposes and that various nodes and/or modules, locations, and/or functionality described above in relation to FIG. 1 may be changed, altered, added, or removed.

Figure 2:
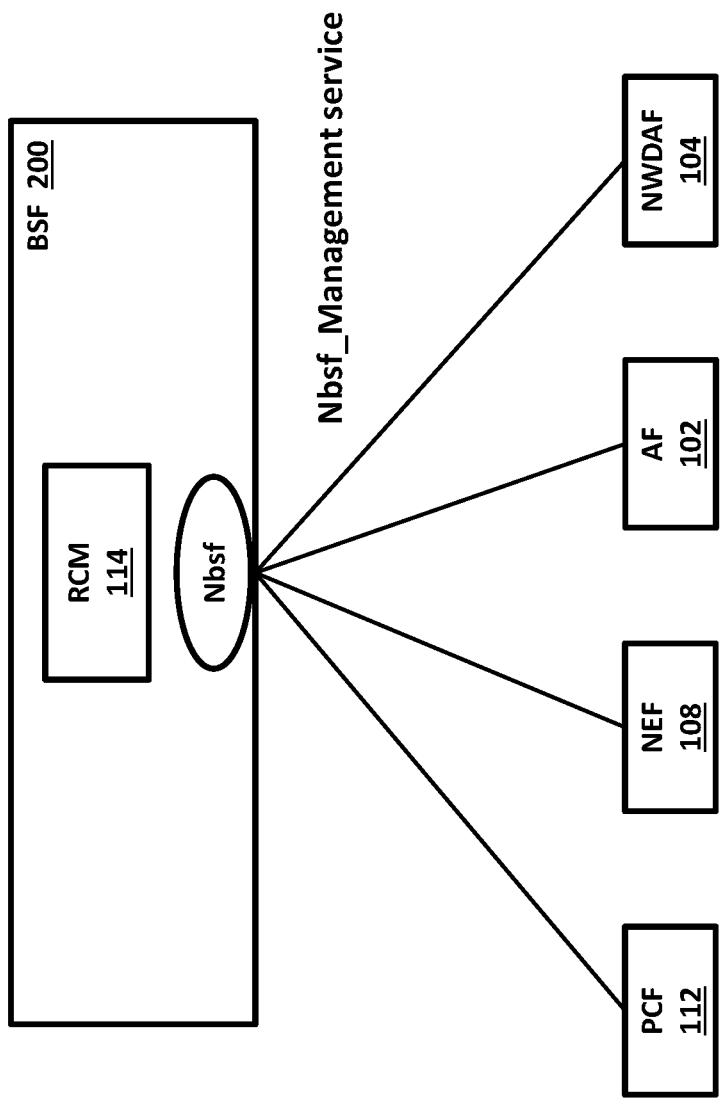
FIG. 2 is a network diagram illustrating an example binding support function (BSF) and various functions that communicate with the BSF.

FIG. 2 is a network diagram illustrating an example BSF 200 and various functions that communicate with BSF 200. BSF 200 may represent an NF that stores bindings (also referred to herein as binding records) between PDU sessions and PCFs and allows discovery of bindings to other nodes. In some embodiments, BSF 200 may be implemented using a node or computing device with one or more processors and memory. In such embodiments, BSF 200 or a related node may include hardware, firmware, and software. For example, BSF 200 a related node may include physical processors, data storage, communications interfaces (e.g., network interface cards), and/or other components.

Referring to FIG. 2, BSF 200 may provide a service referred to as the Nbsf_Management service. The Nbsf_Management service is defined in 3GPP TS 29.521 V16.7.0 (2021-03). In some embodiments, the Nbsf_Management service may be used for BSF 200 to provide PDU session binding functionality, which ensures that an AF request for a PDU session reaches the PCF (e.g., PCF 112) holding the PDU session information. The Nbsf_Management service may allow NF service consumers to register, update, and remove binding information. The Nbsf_Management service may also allows consumers to retrieve binding information.

As shown in FIG. 2, NF service consumers of the Nbsf_Management service provided by BSF 200 may include PCF 112, NEF 108, AF 102, and NWDAF 104. In some embodiments, PCF 112 may register binding information in BSF 200 for a UE when an IPv4 address and/or an IPv6 prefix is allocated, or when a MAC address is used for a PDU session. In such embodiments, PCF 112 may also update binding information with BSF 200 when UE address information is changed for a PDU session. In some embodiments, PCF 112 may remove binding information in BSF 200 when an IPv4 address and/or an IPv6 prefix is released or a MAC address is not used for the PDU session.

In some embodiments, NEF 108 may provide a procedure or means for AF 102 to securely interact with the policy framework for policy control to a 3GPP network. During the procedure, any NEF 108 may discover a relevant (e.g., selected or serving) PCF (e.g., PCF 112) using the Nbsf_Management_Discovery service operation.

In some embodiments, AF 102 may discover a relevant PCF (e.g., PCF 112) using the Nbsf_Management_Discovery service operation when AF 102 is allowed to interact directly with the policy framework for policy control. In some embodiments, NWDAF 104 may discover a relevant PCF (e.g., PCF 112) using the Nbsf_Management_Discovery service.

management services offered by BSF 200 may include Nbsf_Management_Register service, Nbsf_Management_Deregister service, Nbsf_Management_Discovery service, and Nbsf_Management_Update service. Nbsf_Management_Register and Nbsf_Management_Deregister services may be used by PCFs to register and deregister session bindings for a UE. The Nbsf_Management_Update service may be used by PCFs to update a session binding for a UE when a UE address for a PDU session changes. The Nbsf_Management_Discovery service may be used by various NF service consumers (e.g., NEFs, AFs, and NWDAFs) to discover PDU session binding information for a UE.

In some embodiments, BSF 200 may include RCM 114. RCM 114 may be any suitable entity (e.g., software executing on at least one processor) and may include functionality for performing various aspects associated with stale binding record detection and/or resource cleanup. For example, BSF 200 or RCM 114 therein may determine potentially stale binding records, may request and/or receive confirmation (e.g., from PCF 112) regarding whether the binding records are actually stale (e.g., inactive), and may initiate or trigger resource cleanup (e.g., session information cleanup) for binding record determined to be stale or inactive, e.g., via PCF 112 or directly (e.g., not via PCF 112).

In some embodiments, BSF 200 may be allowed to use POST operations associated with SMF 116. In such embodiments, BSF 200 may be authorized to trigger terminate session notification created by SMF 116 at PCF 112.

It will be appreciated that FIG. 2 and its related description are for illustrative purposes and that BSF 200 may include additional and/or different modules, components, or functionality.

FIG. 3 depicts example context data 300 associated with a binding record. Context data 300 may represent any information usable for identifying network entities (e.g., NFs) or related subscriptions or resources that may need to be cleaned up when a binding record is stale. For example, context data 300 may include information about various subscriptions or resources at other NFs that were created (e.g., by PCF 112 for a related session). In this example, when receiving context data 300 from BSF 200 after PCF 112 has suffered context data loss, PCF 112 may use the data

TABLE 1

Operation of the Nbsf_management Service

| Service operation name | Description | Initiated by |
| --- | --- | --- |
| Nbsf_Management_Register | This service operation is used to register the binding information for a UE when an IPv4 address and/or an IPv6 prefix is allocated for an Internet protocol (IP) PDU Session or a MAC address is used for an Ethernet PDU session. | NF service consumer (PCF) |
| Nbsf_Management_Deregister | This service operation is used to deregister the binding information for a UE. | NF service consumer (PCF) |
| Nbsf_Management_Discovery | This service operation is used by an NEF or AF or NWDAF to discover a selected PCF. | NF service consumer (NEF, AF, NWDAF) |
| Nbsf_Management_Update | This service operation is used to update an existing session binding information for a UE (i.e. UE address(es) for a PDU Session). | NF service consumer (PCF) |

Table 1 shown above illustrates the operation of the Nbsf_Management service. As shown in Table 1, the Nbsf_ to identify NFs that may need resource cleanup and then initiate resource cleanup at those NFs.

In some embodiments, context data 300 may be provided to PCF 112 or other entities in various formats and/or forms and such formats and/or forms may be extended for specific use cases or future parameters. In some embodiments, context data 300 may be stored or provided as one or more vendor-specific extensions, such as those described in section 6.6.3 of 3GPP technical specification (TS) 29.500; V16.7.0 (2021-03).

In some embodiments, context data 300 or portions thereof may be stored in a data store as a data object (e.g., a JSON object) or other data structure. In some embodiments, e.g., when transmitting between BSF 200 and PCF 112, context data 300 or portions thereof may be store in a message payload as a cookie, a nested attribute value pair (AVP), or one or more information elements.

Referring to FIG. 3, context data 300 may be depicted in a vendor-specific extension comprising various mandatory and optional parameter values. As depicted in FIG. 3, a first mandatory parameter "version" may indicate a value for indicating the version of the vendor-specific extension, An example "version" value may be "1" for indicating an initial or default format. In some embodiments, depending on the version, the number of parameters and/or whether certain parameters are mandatory or optional may vary for a vendor-specific extension containing context data associated with a binding record.

A second mandatory parameter "notificationURL" may indicate a URL, a network address, or other value for notifying or communicating with PCF 112, e.g., by BSF 200 to notify PCF 112 about a potentially stale binding record. An example "notificationURL" value may be an internal URL or external URL that utilizes a representational state transfer (REST) protocol API(s), a hyperlink transfer protocol (HTTP) API(s), or related messages.

A third mandatory parameter "bindingCreateUpdateTime" may indicate a timestamp or other value for indicating when a related binding record was created or updated. An example "bindingCreateUpdateTime" value may be a timestamp that indicates an associated binding record was last updated 12,453 seconds ago. In some embodiments, PCF 112 may use a "bindingCreateUpdateTime" timestamp to determine whether the binding record was updated after a most recent PCF recovery by comparing the "bindingCreateUpdateTime" timestamp to the PCF recovery timestamp. In such embodiments, if the "bindingCreateUpdateTime" timestamp is newer than the PCF recovery timestamp, PCF 112 may not initiate at least some resource cleanup operations with UDR 106 or CHF 110.

In some embodiments, context data 300 may include optional information elements that are based at least in part on resources used for a related session. For example, optional information elements may exist for one or more NFs that are associated with a binding record or a related session and may include information about other subscriptions or resources that PCF 112 might have created at those NFs. In some embodiments, optional information elements may be provided or listed in various orders, e.g., randomly, format defined, time-based, or alphabetically.

As depicted in FIG. 3, an example optional information element may be for storing information related to SMF 116. The example SMF information element may include various parameters or types of data associated with a binding record or a related session. For example, a parameter "notificationURL" may indicate a URL, a network address, or other value for notifying or communicating with SMF 116, e.g., so that PCF 112 or another entity may trigger or initiate resource cleanup at SMF 116 or notify SMF 116 about a stale binding record or related session.

Another example optional information element may be for storing information related to UDR 106. The example UDR information element may include various parameters or types of data associated with a binding record or a related session. For example, a parameter "resourceUrl" may indicate a URL, a network address, or other value for notifying or communicating with UDR 106, e.g., so that PCF 112 or another entity may trigger or initiate resource cleanup at UDR 106 or notify UDR 106 about a stale binding record or related session.

Another example optional information element may be for storing information related to CHF 110. The example CHF information element may include various parameters or types of data associated with a binding record or a related session. For example, a parameter "resourceUrl" may indicate a URL, a network address, or other value for notifying or communicating with CHF 110, e.g., so that PCF 112 or another entity may trigger or initiate resource cleanup at CHF 110 or notify CHF 110 about a stale binding record or related session.

It will be appreciated that context data 300 is for illustrative purposes and that different and/or additional data than the data depicted in FIG. 3 may be usable for indicating NF IDs or other information associated with a binding record.

Figure 4:
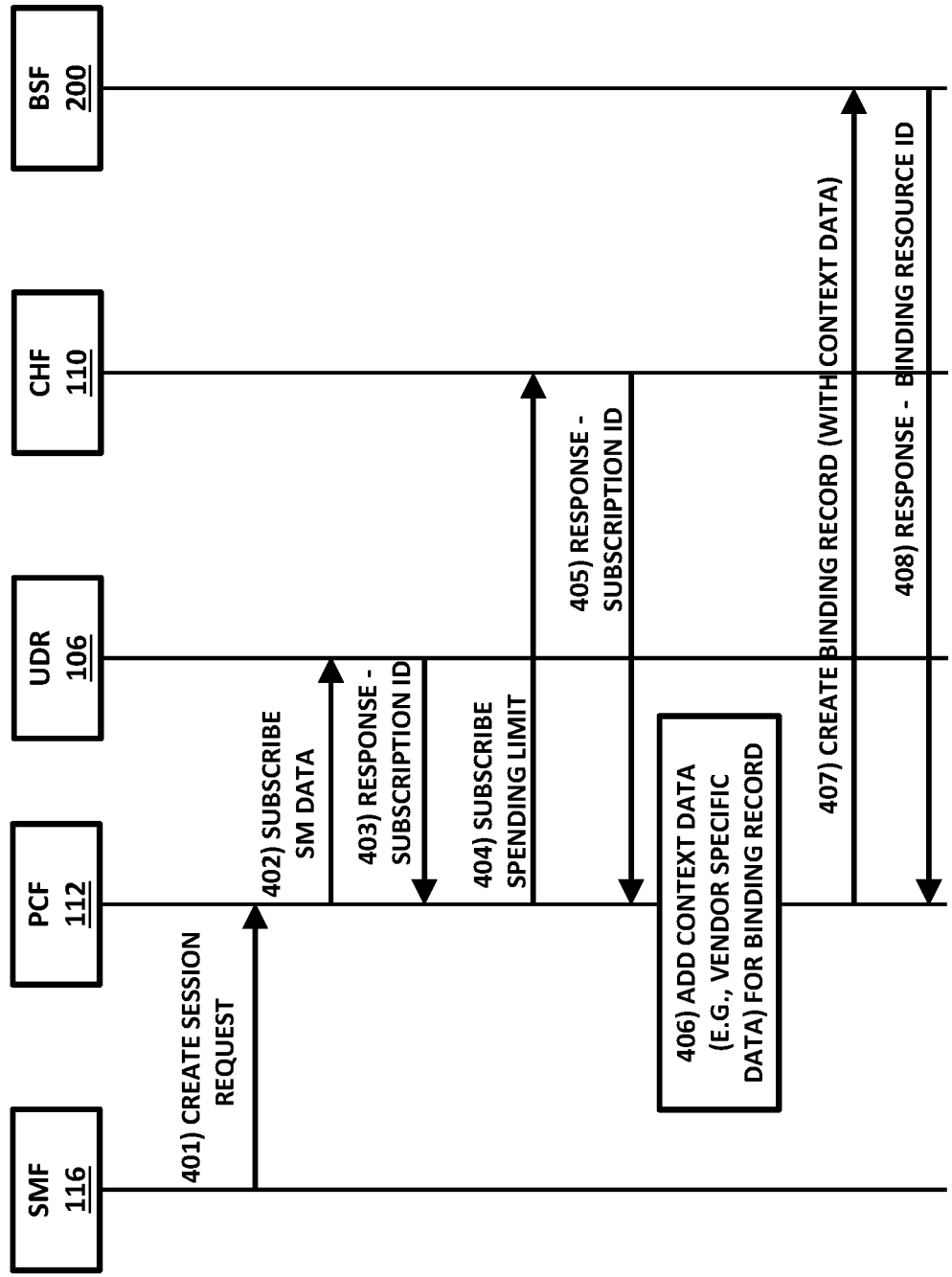
FIG. 4 is a message flow diagram illustrating creation of a binding record.

FIG. 4 is a message flow diagram illustrating creation of a binding record. In some embodiments, e.g., after SMF 116 has sent a create session request, PCF 112 may gather or obtain various data (e.g., subscriber data and charging information) from one various network entity and may send a create binding record request to BSF 200. In such embodiments, the create binding record may indicate that the new session is associated with a particular PCF 112 and or other particular network entities, e.g., UDR 106 and CHF 110. For example, the create binding record may utilize a cookie or an information element(s) to provide context data (e.g., data 300) about the session or binding record being created.

Referring to FIG. 4, in step 401, a create session request or another message for creating a protocol data unit (PDU) session is sent from SMF 116 to PCF 112.

In step 402, a subscribe session management (SM) message or another message may be sent from PCF 112 to UDR 106 for requesting subscription information or changes thereafter, e.g., a subscription permanent ID (SUPI), a data network name (DNN), and/or single—network slice selection assistance information (S-NSSAI).

In step 403, a response message including the subscription information or a related subscription ID may be sent from UDR 106 to PCF 112.

In step 404, a subscribe spending limit reporting message or another message may be sent from PCF 112 to CHF 110 for requesting charging and/or spending information or changes thereafter.

In step 405, a response message including the charging and/or spending information or a related subscription ID may be sent from CHF 110 to PCF 112.

In step 406, context data may be generated and/or added to a request to create a binding record. For example, context data may include URLs or network addresses for communicating with various network entities or services thereof. In some embodiments, context data (e.g., data 300) may be stored or transmitted in one or more vendor specific extensions or data objects.

In step 407, a create binding record request (e.g., an HTTP POST request to invoke an Nbsf_Management_Register service operation) may be sent from PCF 112 to BSF 200.

In some embodiments, the create binding record may include a cookie or other context data for indicating various network entities (e.g., SMF 116, PCF 112, UDR 106, and/or CHF 110) associated with a session corresponding to the binding record.

In step 408, a response message (e.g., an HTTP 201 Created message) indicating a binding resource ID for identifying the created binding record may be sent from BSF 200 to PCF 112.

It will be appreciated that FIG. 4 is for illustrative purposes and that different and/or additional messages and/or actions may be used. It will also be appreciated that various messages and/or actions described herein may occur in a different order or sequence.

Figure 5:
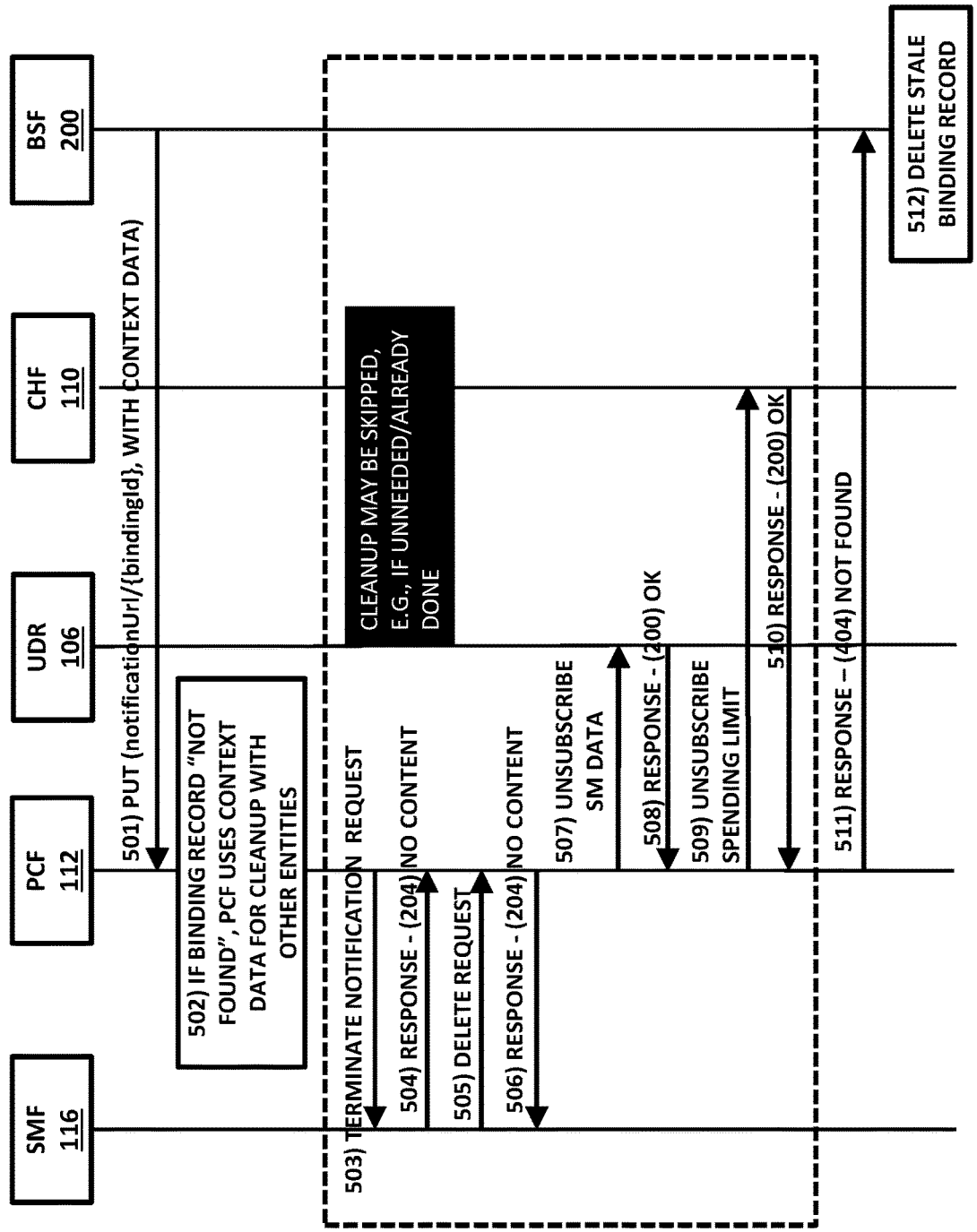
FIG. 5 is a message flow diagram illustrating PCF related resource cleanup.

FIG. 5 is a message flow diagram illustrating PCF related resource cleanup. In some embodiments, BSF 200 or RCM 114 therein may be configured for confirming or verifying with PCF 112 whether a potentially stale binding record is stale before performing local cleanup (e.g., deleting the binding record at BSF 200). For example, BSF 200 may send a notification about a potentially stale binding record to PCF 112 and, depending on the response from PCF 112, BSF 200 may either delete the binding record or mark the binding record as active.

In some embodiments, PCF 112 or RCM 114 therein may be configured for initiating resource cleanup (e.g., session record cleanup) at itself and/or other network entities in response to a notification by BSF 200. For example, after receiving a notification about a binding record and determining that the binding record is stale, PCF 112 may use context data (e.g., sent with the notification) to identify relevant network entities that may need resource cleanup and may initiate resource cleanup at the identified network entities.

In some embodiments, e.g., prior to initiating cleanup at other network entities, PCF 112 may determine whether a received notification is relevant, e.g., whether resource cleanup associated with a binding record should be performed. For example, when PCF 112 receives a notification about a binding record, the notification may include a timestamp (e.g., a bindingCreateUpdateTime' timestamp) indicating the last time the binding record was updated or accessed. In this example, PCF 112 may compare the binding record timestamp to a PCF recovery timestamp indicating when PCF 112 recovered from a crash or failure. If the binding record timestamp is older than the PCF recovery timestamp or if the binding record timestamp is the same age as the PCF recovery timestamp, PCF 112 may use context data in the notification to initiate resource cleanup at one or more network entities. However, if the binding record timestamp is newer than the PCF recovery timestamp, PCF 112 may not initiate resource cleanup, e.g., PCF 112 may respond to the notification (e.g., indicating resource cleanup was successful) without initiating resource cleanup at another network entity.

Referring to FIG. 5, e.g., prior to step 501, BSF 200 or RCM 114 therein may periodically or aperiodically detect or identify a stale or potentially stale (e.g., inactive) binding record. For example, BSF 200 or RCM 114 therein may detect that a binding record is potentially stale when a record has not been accessed or updated for a predetermined amount of time (e.g., by checking timestamps), if an error response is received for a particular session or flow, or if one or more network events occur, e.g., a related UE detaches from the network.

In step 501, a notification (e.g., a PUT operation or related message) for indicating a potentially stale binding record from BSF 200 to PCF 112. For example, a notification may be directed to a notification URL associated with PCF 112 and may include a binding resource ID for indicating a binding record along with related context data (e.g., a cookie or AVP indicating an SMF URL, a UDR URL, and/or a CHF URL).

In some embodiments, a notification may include a PUT operation with a URI of "notificationUrl/{bindingId}" of PCF 112 to check for stale bindings, where the {bindingID} may represent an ID for indicating or identifying a particular binding record that BSF 200 is referring to.

In some embodiments, PCF 112 may receive a notification and then determine that a binding record associated with the notification is stale or inactive. For example, PCF 112 may maintain or access a local data store containing active binding or related session records, where the data store uses a binding resource ID as a lookup key. In this example, PCF 112 may obtain a binding resource ID from a notification and may use the binding resource ID to lookup a record in the local data store. Continuing with this example, if no record is found PCF 112 may determine that the binding record associated with the binding resource ID is inactive and if a record is found PCF 112 may determine that the binding record associated with the binding resource ID is active.

In step 502, after determining a binding record is stale or inactive, PCF 112 may use context data (e.g., data 300) associated with the binding record to initiate resource cleanup (e.g., session cleanup) at SMF 116 and/or other network entities.

In step 503, a trigger message (e.g., a terminate notification) for triggering cleanup may be sent to SMF 116 (e.g., using an SMF URL of data 300) from PCF 112. For example, a trigger message may indicate the session resource ID or other ID for deleting related session information. In this example, the trigger message may be configurable between PCF 112 and SMF 116.

In step 504, a response message (e.g., an HTTP 204 No Content message) may be sent from SMF 116 to PCF 112 indicating that the trigger message was received and/or that cleanup was performed. In this example, the response message may be configurable between PCF 112 and SMF 116 and usable for indicating that cleanup is successful or unsuccessful.

In step 505, a delete request (e.g., an HTTP POST request to invoke an Npcf_SMPolicyContext_DELETE service operation) for deleting one or more resource(s) associated with an SM policy association may be sent to PCF 112 from SMF 116. For example, an HTTP POST request may include a URI of "{apiRoot}/npcf-sm policycontrol/v1/sm-policies/{smPolicyId}/delete", where the {smPolicyId} in the URI identifies the SM policy to be deleted.

In step 506, a response message (e.g., an HTTP 204 No Content message) may be sent from PCF 112 to SMF 116 indicating that the delete request was received and/or that related resource(s) was performed. For example, PCF 112 may acknowledge a delete request by sending an HTTP response message with a corresponding status code indicating success or failure.

In step 507, a trigger message (e.g., an unsubscribe session management (SM) message) for triggering cleanup may be sent to UDR 106 (e.g., using a UDR URL of data 300) from PCF 112. For example, a trigger message may indicate the binding resource ID or other ID for deleting related session information. In this example, the trigger message may be configurable between PCF 112 and UDR 106.

In step 508, a response message (e.g., an HTTP 200 OK message) may be sent from UDR 106 to PCF 112 indicating that the trigger message was received and/or that cleanup was performed. For example, the response message may be configurable between PCF 112 and UDR 106 and usable for indicating that cleanup is successful or unsuccessful.

In step 509, a trigger message (e.g., an unsubscribe spending limit message) for triggering cleanup may be sent to CHF 110 (e.g., using a CHF URL of data 300) from PCF 112. For example, a trigger message may indicate the binding resource ID or other ID for deleting related session information. In this example, the trigger message may be configurable between PCF 112 and CHF 110.

In step 510, a response message (e.g., an HTTP 200 OK message) may be sent from CHF 110 to PCF 112 indicating that the trigger message was received and/or that cleanup was performed. For example, the response message may be configurable between PCF 112 and CHF 110 and usable for indicating that cleanup is successful or unsuccessful.

In step 511, a response message (e.g., an HTTP 404 Not Found message) may be sent from PCF 112 to BSF 200 indicating that the binding record associated with the notification message was stale (e.g., inactive) and/or that resource cleanup was performed. For example, the response message may be configurable between PCF 112 and BSF 200 and usable for indicating that the binding record was determined to be inactive and/or that related resource cleanup is successful or unsuccessful.

In step 512, e.g., after receiving a response from PCF 112, BSF 200 may delete the binding record from its own data store.

In some embodiments, e.g., before, concurrently with, or after initiating resource cleanup at other network entities, PCF 112 may perform any necessary cleanup related to the binding record and may then send a response message that local cleanup is successful or unsuccessful.

It will be appreciated that FIG. 5 is for illustrative purposes and that different and/or additional messages and/or actions may be used. It will also be appreciated that various messages and/or actions described herein may occur in a different order or sequence. For example, PCF 112 may send trigger messages to network entities in various orders than depicted. In another example, PCF 112 may send trigger message various network entities (e.g., SMF 116, CHF 110, and UDR 106) concurrently.

Figure 6:
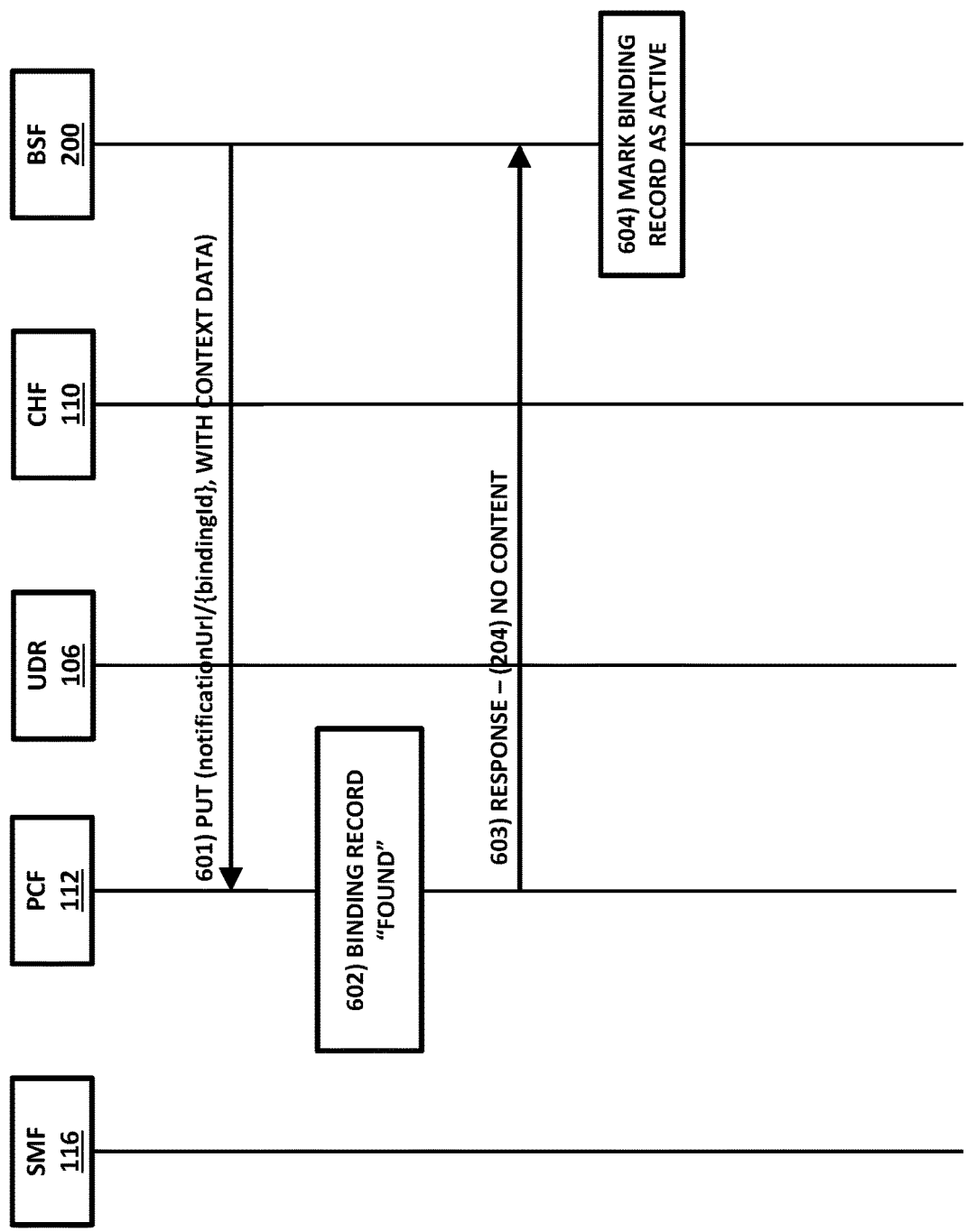
FIG. 6 is a message flow diagram illustrating a BSF determining that a potentially stale binding record is active.

FIG. 6 is a message flow diagram illustrating BSF 200 determining that a potentially stale binding record is active. In some embodiments, BSF 200 or RCM 114 therein may be configured for confirming or verifying with PCF 112 whether a potentially stale binding record is stale before performing local cleanup (e.g., deleting the binding record at BSF 200). For example, BSF 200 may send a notification about a potentially stale binding record to PCF 112 and, depending on the response from PCF 112, BSF 200 may either delete the binding record or mark the binding record as active.

Referring to FIG. 6, e.g., prior to step 601, BSF 200 or RCM 114 therein may periodically or aperiodically detect or identify a stale or potentially stale (e.g., inactive) binding record. For example, BSF 200 or RCM 114 therein may detect that a binding record is potentially stale when a record has not been accessed or updated for a predetermined amount of time (e.g., by checking timestamps), if an error response is received for a particular session or flow, or if one or more network events occur, e.g., a related UE detaches from the network.

In step 601, a notification (e.g., a PUT operation or related message) for indicating a potentially stale binding record from BSF 200 to PCF 112. For example, a notification may be directed to a notification URL associated with PCF 112 and may include a binding resource ID for indicating a binding record along with related context data (e.g., a cookie or AVP indicating an SMF URL, a UDR URL, and/or a CHF URL).

In step 602, PCF 112 may receive the notification and then determine that a binding record associated with the notification is active. For example, PCF 112 may maintain or access a local data store containing active binding or related session records, where the data store uses a binding resource ID as a lookup key. In this example, PCF 112 may obtain a binding resource ID from a notification and may use the binding resource ID to lookup a record in the local data store. Continuing with this example, if no record is found PCF 112 may determine that the binding record associated with the binding resource ID is inactive and if a record is found PCF 112 may determine that the binding record associated with the binding resource ID is active.

In step 603, a response message (e.g., an HTTP 204 No Content message) indicating the binding record is active may be sent from PCF 112 to BSF 200. In this example, the response message may be configurable between BSF 200 and PCF 112 (or other network entities) and usable for indicating that the binding record is active (and should not be deleted) or that the binding record is inactive (and should be deleted).

In step 604, e.g., after receiving a response from PCF 112 indicating that the binding record is active, BSF 200 may mark the binding record as active.

It will be appreciated that FIG. 6 is for illustrative purposes and that different and/or additional messages and/or actions may be used. It will also be appreciated that various messages and/or actions described herein may occur in a different order or sequence.

Figure 7:
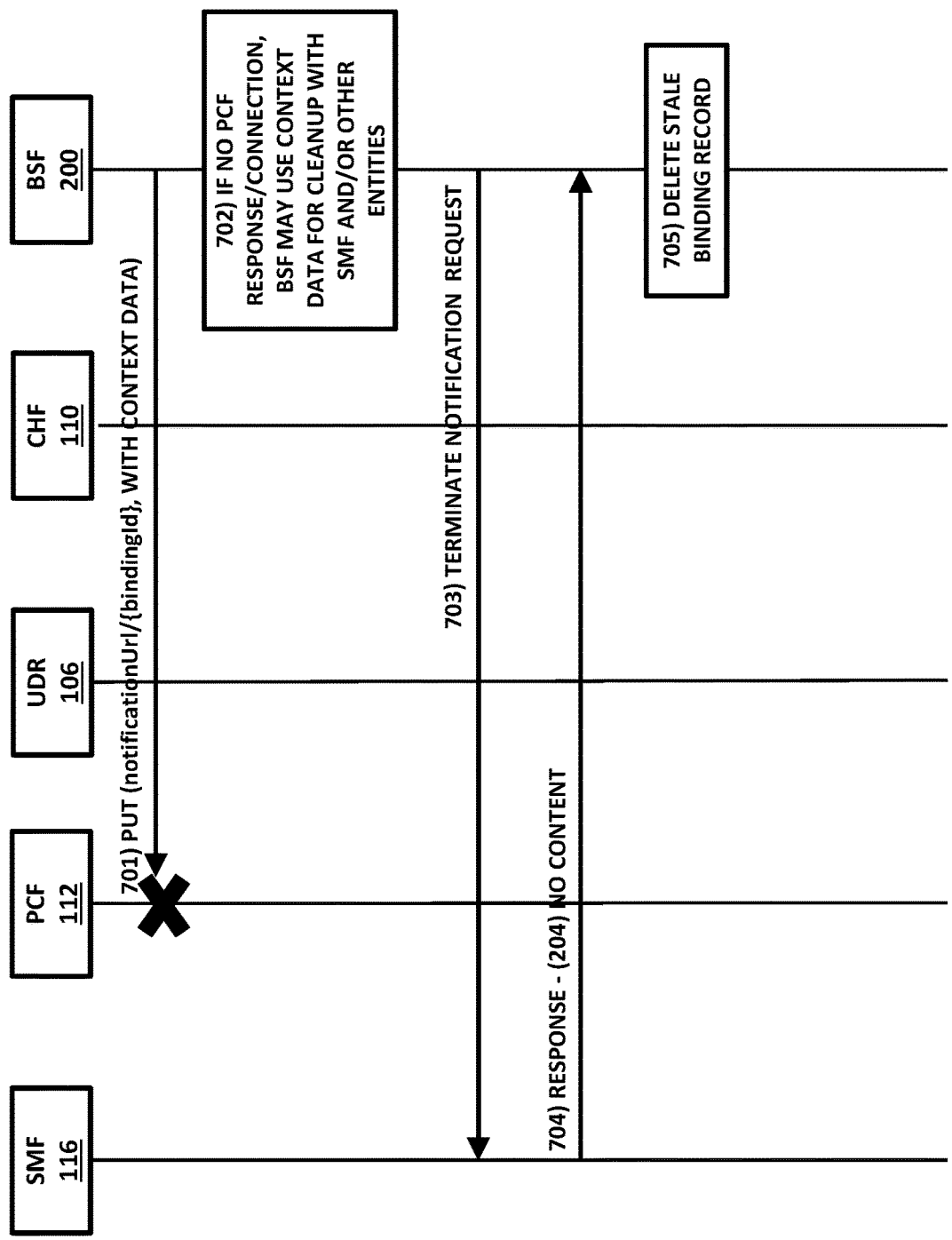
FIG. 7 is a message flow diagram illustrating SMF cleanup in response to a BSF sending a trigger message.

FIG. 7 is a message flow diagram illustrating SMF cleanup in response to BSF 200 sending a trigger message. In some embodiments, BSF 200 or RCM 114 therein may be configured for initiating SMF cleanup by sending a trigger message (e.g., a terminate notification request) when one or more conditions or settings are met. For example, BSF 200 may send a notification about a potentially stale binding record to PCF 112 and, if BSF 200 does not receive a response from PCF 112 (e.g., within a preconfigured period of time), BSF 200 may assume or determine that PCF 112 is unavailable, unresponsive, or unreachable. Optionally, if PCF has provided 3gpp-Sbi-Routing-Binding header during binding creation at BSF, then BSF my initiate retry notification at alternate PCF instances as well. In this example, after determine that PCF 112 is unavailable, unresponsive, or unreachable, BSF 200 may decode and/or use context data associated with a relevant binding record and then initiate, using the context data, resource cleanup at SMF 116, e.g., by sending a terminate notification request to SMF 116 for triggering SMF 116 to clean or delete session information associated with the binding record.

Referring to FIG. 7, e.g., prior to step 701, BSF 200 or RCM 114 therein may periodically or aperiodically detect or identify a stale or potentially stale (e.g., inactive) binding record. For example, BSF 200 or RCM 114 therein may detect that a binding record is potentially stale when a record has not been accessed or updated for a predetermined amount of time (e.g., by checking timestamps), if an error response is received for a particular session or flow, or if one or more network events occur, e.g., a related UE detaches from the network.

In step 701, a notification (e.g., a PUT operation or related message) for indicating a potentially stale binding record from BSF 200 to PCF 112. For example, a notification may be directed to a notification URL associated with PCF 112 and may include a binding resource ID for indicating a binding record along with related context data (e.g., a cookie or AVP indicating an SMF URL, a UDR URL, and/or a CHF URL).

In step 702, BSF 200 may wait for PCF 112 to respond and, if no response is detected after a particular amount of time, BSF 200 may obtain and use context data to initiate resource cleanup (e.g., session cleanup) at SMF 116 and/or other network entities.

In step 703, a trigger message (e.g., a terminate notification) for triggering cleanup may be sent to SMF 116 (e.g., using an SMF URL of the context data) from BSF 200. For example, a trigger message may indicate the binding resource ID or other ID for deleting related session information. In this example, the trigger message may be configurable between BSF 200 and SMF 116 (or other network entities).

In step 704, a response message (e.g., an HTTP 204 No Content message) may be sent from SMF 116 to BSF 200 indicating that the trigger message was received and/or that cleanup was performed. In this example, the response message may be configurable between BSF 200 and SMF 116 (or other network entities) and usable for indicating that cleanup is successful or unsuccessful.

In step 705, e.g., after receiving a response from SMF 116, BSF 200 may delete the binding record from its own data store.

It will be appreciated that FIG. 7 is for illustrative purposes and that different and/or additional messages and/or actions may be used. It will also be appreciated that various messages and/or actions described herein may occur in a different order or sequence.

Figure 8:
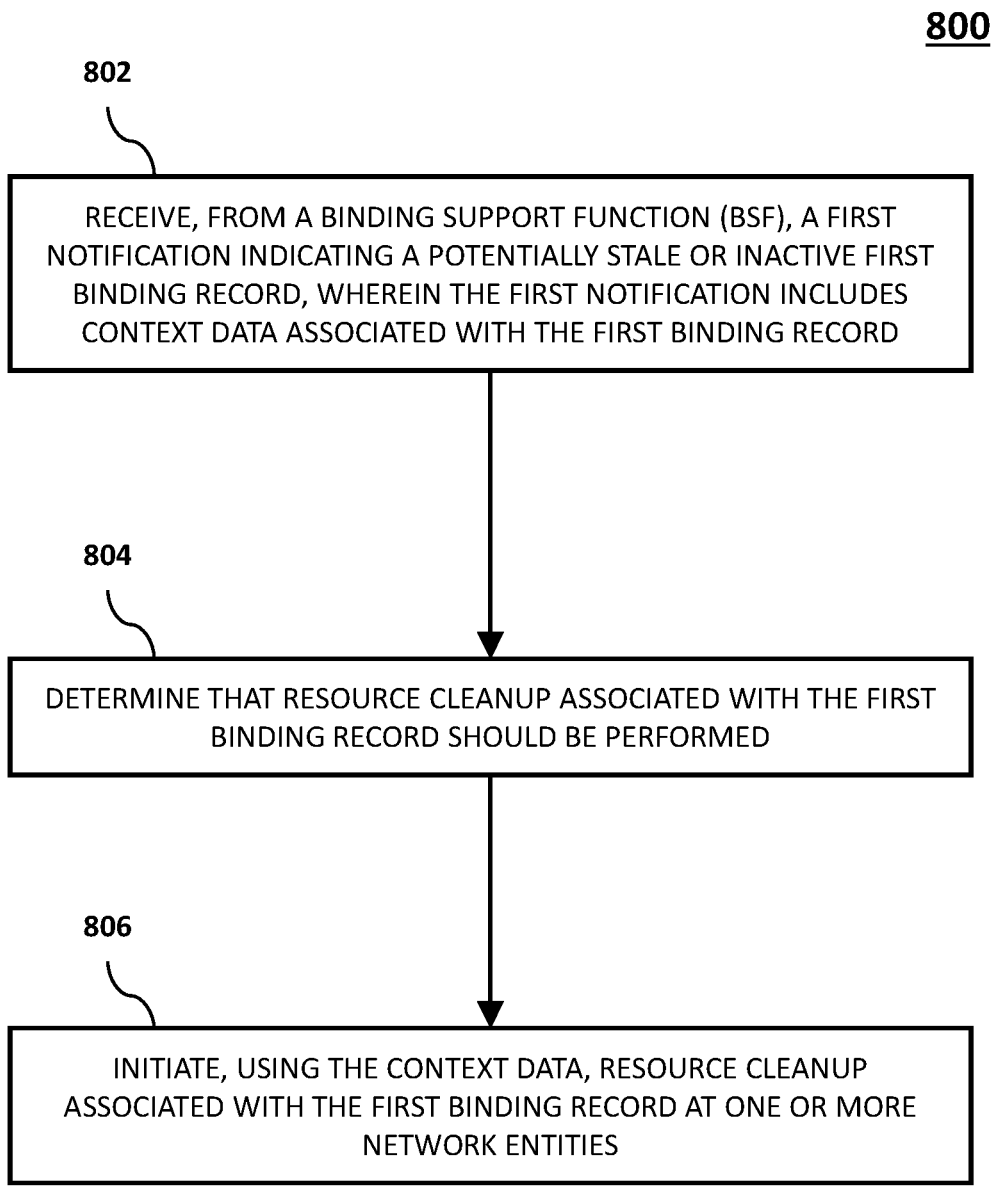
FIG. 8 is a flow chart illustrating an example process for resource cleanup in a communications network.

FIG. 8 is a diagram illustrating an example process 800 for resource cleanup in a communications network. In some embodiments, example process 800 described herein, or portions thereof, may be performed at or performed by a network node, e.g., PCF 112, RCM 114, and/or another module, NF, or node.

In step 802, a first notification indicating a potentially stale or inactive first binding record may be received from a BSF (e.g., BSF 200), where the first notification includes context data associated with the first binding record.

In step 804, it may be determined that resource cleanup associated with the first binding record should be performed.

In some embodiments, determining that resource cleanup associated with a binding record should be performed may include determining that a timestamp associated with the binding record may be older than a PCF recovery timestamp. when PCF 112 receives a notification about a binding record, the notification may include a timestamp (e.g., a bindingCreateUpdateTime' timestamp) indicating the last time the binding record was updated or accessed. In this example, PCF 112 may compare the binding record timestamp to a PCF recovery timestamp indicating when PCF 112 recovered from a crash or failure. If the binding record timestamp is older than the PCF recovery timestamp or if the binding record timestamp is the same age as the PCF recovery timestamp, PCF 112 may use context data in the notification to initiate resource cleanup at one or more network entities. However, if the binding record timestamp is newer than the PCF recovery timestamp, PCF 112 may not initiate resource cleanup, e.g., PCF 112 may respond to the notification (e.g., indicating resource clean was successful) without initiating resource cleanup at another network entity.

In step 806, resource cleanup associated with the first binding record at one or more network entities may be initiated using the context data.

In some embodiments, initiating resource cleanup may include using context data to identify a first network entity (e.g., SMF 116, CHF 110, NWDAF 104, UDR 106, etc.) and sending, to the first network entity, a message for triggering resource cleanup at the first network entity.

In some embodiments, a message (e.g., for triggering resource cleanup at a network entity) may include a terminate notification request, an unsubscribe service message, an unsubscribe session management message, an unsubscribe spending limit reporting message, or a message indicating that a binding record was not found.

In some embodiments, PCF 112 may be configured for receiving, from BSF 200, a second notification indicating a potentially stale or inactive second binding record, wherein the first notification includes context data associated with the second binding record; determining that the second binding record is active; and sending a message to the BSF indicating that the second binding record is active.

In some embodiments, a notification (e.g., from BSF 200 indicating a potentially stale binding record) may be a REST protocol operation, an HTTP PUT operation, or a related message and wherein the notification uses a URL (e.g., provided by PCF 112 during a binding record creation procedure) to communicate with PCF 112. In such embodiments, the REST protocol operation or related message may include or indicate a binding ID for indicating a particular binding record.

In some embodiments, the context data may include a URL, a uniform resource identifier (URI), a uniform resource locator (URL), a fully qualified domain name (FQDN), or a network address (e.g., an IP address and, optionally, a port number) associated with a first network entity of the one or more network entities.

In some embodiments, one or more network entities (e.g., where resource cleanup is initiated) may include SMF 116, CHF 110, NWDAF 104, UDR 106, BSF 200, or an NF.

In some embodiments, BSF 200 may initiate, using context data associated with a binding record, resource cleanup associated with the binding record at one or more network entities, e.g., when one or more conditions may be met, e.g., determining that the PCF may be unavailable, unresponsive, or unreachable. For example, BSF 200 may attempt to send a notification about a potentially stale binding record to PCF 112 and, if BSF 200 does not receive a response from PCF 112 (e.g., within a preconfigured period of time), BSF 200 may decode context data associated with the binding record and then initiate, using the context data, resource cleanup. For example, to initiate resource cleanup at SMF 116, BSF 200 may send a terminate notification request to SMF 116 for triggering SMF 116 to clean or delete session information associated with a stale binding record.

It will be appreciated that process 800 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that utilizes binding records or related repositories may use features, mechanisms and techniques described herein to perform or facilitate efficient resource cleanup in a communications network, e.g., after PCF 112 or another entity experiences a crash.

It should be noted that BSF 200, PCF 112, RCM 114, and/or functionality described herein may constitute a special purpose computing device. Further, BSF 200, PCF 112, RCM 114, and/or functionality described herein can improve the technological field of resource cleanup and/or resource management in a communications network. For example, BSF 200 may utilize an interface with PCF 112 for verifying or confirming that a binding record is stale or inactive before deleting or removing the binding record. Further, PCF 112 may use context data obtained from BSF 200 to perform resource cleanup (e.g., stale session cleanup) associated with other NFs, e.g., during or after a disaster recovery involving PCF 112.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.500; 3rd Generation Partnership Project; Technical Specification Group Core Network and Terminals; 5G System; Technical Realization of Service Based Architecture; Stage 3 (Release 16); V16.7.0 (2021-03).
2. 3GPP TS 29.521; 3rd Generation Partnership Project; Technical Specification Group Core Network and Terminals; 5G System; Binding Support Management Service; Stage 3 (Release 16); V16.7.0 (2021-03).
3. 3GPP TS 29.513; 3rd Generation Partnership Project; Technical Specification Group Core Network and Terminals; 5G System; Policy and Charging Control signalling flows and QoS parameter mapping; Stage 3 (Release 16); V16.7.0 (2021-03).
4. 3GPP TS 29.519; 3rd Generation Partnership Project; Technical Specification Group Core Network and Terminals; 5G System; Usage of the Unified Data Repository service for Policy Data, Application Data and Structured Data for Exposure; Stage 3 (Release 16); V16.7.0 (2021-03).
5. 3GPP TS 29.594; 3rd Generation Partnership Project; Technical Specification Group Core Network and Terminals; 5G System; Spending Limit Control Service; Stage 3 (Release 16); V16.5.0 (2021-03).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for resource cleanup in a communications network, the method comprising:
    at a policy control function (PCF) comprising at least one processor:
        receiving, from a binding support function (BSF), a first notification indicating a potentially stale or inactive first binding record, wherein the first notification includes context data associated with the first binding record;
        determining that resource cleanup associated with the first binding record should be performed; and
        initiating, using the context data, resource cleanup associated with the first binding record at one or more network entities, wherein initiating the resource cleanup comprises: using the context data to identify a first network entity of the one or more network entities; and sending, to the first network entity, a message for triggering resource cleanup at the first network entity.

2. The method of claim 1 wherein determining that resource cleanup associated with the first binding record should be performed includes determining that a timestamp associated with the first binding record is older than a PCF recovery timestamp or determining that the timestamp associated with the first binding record and the PCF recovery timestamp are the same age.

3. The method of claim 1 wherein the message includes a terminate notification request, an unsubscribe service message, an unsubscribe session management message, an unsubscribe spending limit reporting message, or a message indicating that the first binding record or a related session was not found.

4. The method of claim 1 comprising:
    at the PCF:
        receiving, from the BSF, a second notification indicating a potentially stale or inactive second binding record, wherein the second notification includes context data associated with the potentially stale or inactive second binding record;
        determining that the potentially stale or inactive second binding record is active; and
        sending a message to the BSF indicating that the potentially stale or inactive second binding record is active.

5. The method of claim 1 wherein the first notification is a representational state transfer (REST) protocol operation or a hyperlink transfer protocol (HTTP) PUT operation or related message and wherein the notification uses a uniform resource locator provided by the PCF to communicate with the PCF.

6. The method of claim 1 wherein the context data includes a uniform resource identifier (URI), a uniform resource locator (URL), a fully qualified domain name (FQDN), or a network address associated with a first network entity of the one or more network entities.

7. The method of claim 1 wherein the one or more network entities includes a session management function (SMF), a charging function (CHF), a network data analytics function (NWDAF), a unified data repository (UDR), the BSF, or a network function (NF).

8. The method of claim 1 wherein the BSF initiates, using context data associated with a third binding record, resource cleanup associated with the third binding record at one or more network entities when one or more conditions are met.

9. A system for resource cleanup in a communications network, the system comprising:
    at least one processor;
    a memory; and
    a policy control function (PCF) implemented using the at least one processor and the memory, the PCF configured for:
        receiving, from a binding support function (BSF), a first notification indicating a potentially stale or inactive first binding record, wherein the first notification includes context data associated with the first binding record;
        determining that resource cleanup associated with the first binding record should be performed; and
        initiating, using the context data, resource cleanup associated with the first binding record at one or more network entities, wherein initiating the resource cleanup comprises: using the context data to identify a first network entity of the one or more network entities; and sending, to the first network entity, a message for triggering resource cleanup at the first network entity.

10. The system of claim 9 wherein the PCF determines that resource cleanup associated with the first binding record should be performed by determining that a timestamp associated with the first binding record is older than a PCF recovery timestamp or determining that the timestamp associated with the first binding record and the PCF recovery timestamp are the same age.

11. The system of claim 9 wherein the message includes a terminate notification request, an unsubscribe service message, an unsubscribe session management message, an unsubscribe spending limit reporting message, or a message indicating that the first binding record or a related session was not found.

12. The system of claim 9 wherein the PCF is configured for:
receiving, from the BSF, a second notification indicating a potentially stale or inactive second binding record, wherein the second notification includes context data associated with the potentially stale or inactive second binding record;
determining that the potentially stale or inactive second binding record is active; and
sending a message to the BSF indicating that the potentially stale or inactive second binding record is active.

13. The system of claim 9 wherein the first notification is a representational state transfer (REST) protocol operation or a hyperlink transfer protocol (HTTP) PUT operation or related message and wherein the notification uses a uniform resource locator provided by the PCF to communicate with the PCF.

14. The system of claim 9 wherein the context data includes a uniform resource identifier (URI), a uniform resource locator (URL), a fully qualified domain name (FQDN), or a network address associated with a first network entity of the one or more network entities.

15. The system of claim 9 wherein the one or more network entities includes a session management function (SMF), a charging function (CHF), a network data analytics function (NWDAF), a unified data repository (UDR), the BSF, or a network function (NF).

16. The system of claim 9 wherein the BSF initiates, using context data associated with a third binding record, resource cleanup associated with the third binding record at one or more network entities when one or more conditions are met.

17. The system of claim 16 wherein the one or more conditions includes determining that the PCF is unavailable, unresponsive, or unreachable.

18. A non-transitory computer readable medium having stored thereon executable instructions that when executed by at least one processor of a computer cause the computer to perform steps comprising: at a policy control function (PCF):
receiving, from a binding support function (BSF), a first notification indicating a potentially stale or inactive first binding record, wherein the first notification includes context data associated with the first binding record;
determining that resource cleanup associated with the first binding record should be performed; and
initiating, using the context data, resource cleanup associated with the first binding record at one or more network entities, wherein initiating the resource cleanup comprises: using the context data to identify a first network entity of the one or more network entities; and sending, to the first network entity, a message for triggering resource cleanup at the first network entity.

\* \* \* \* \*